June 1, 1965   J. N. COLEBROOK   3,186,269
BORING AND TURNING LATHES
Filed July 3, 1961   4 Sheets-Sheet 1
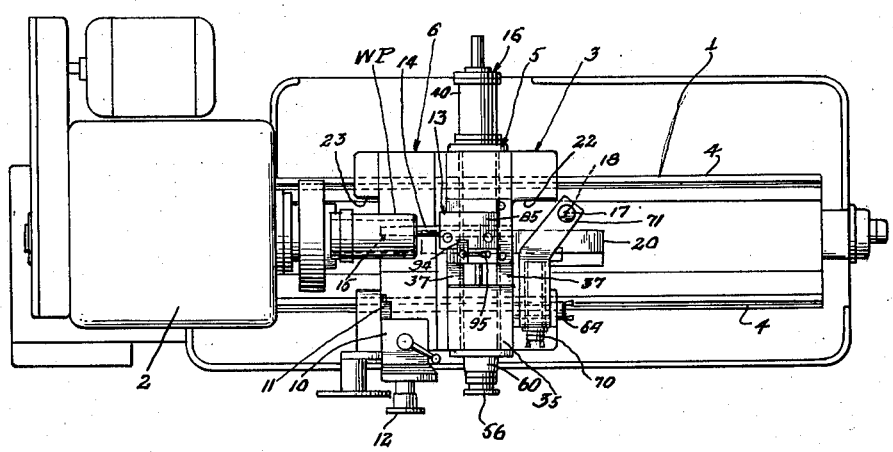
INVENTOR
James N. Colebrook
BY
Synnestvedt & Lechner
ATTORNEYS

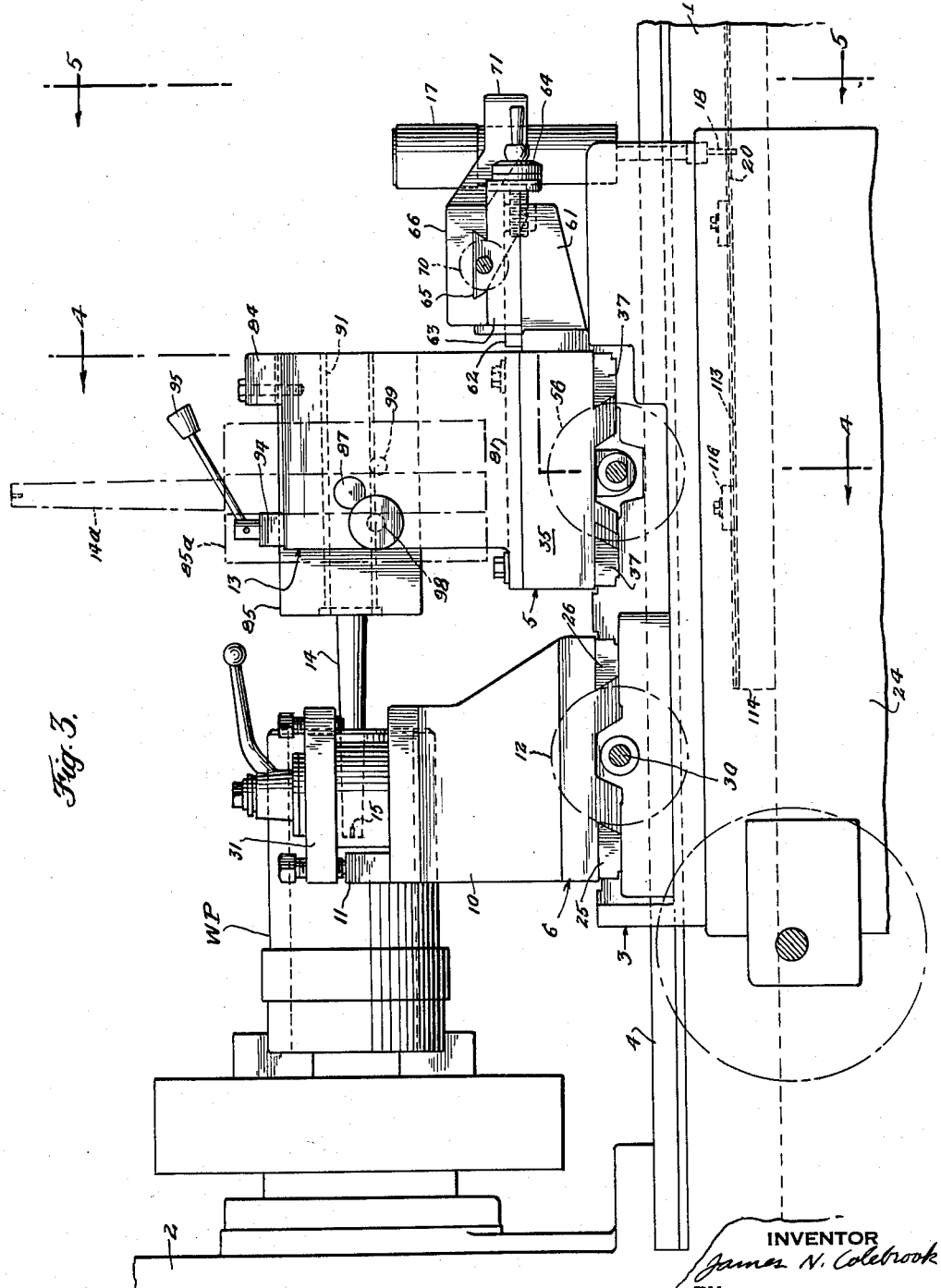

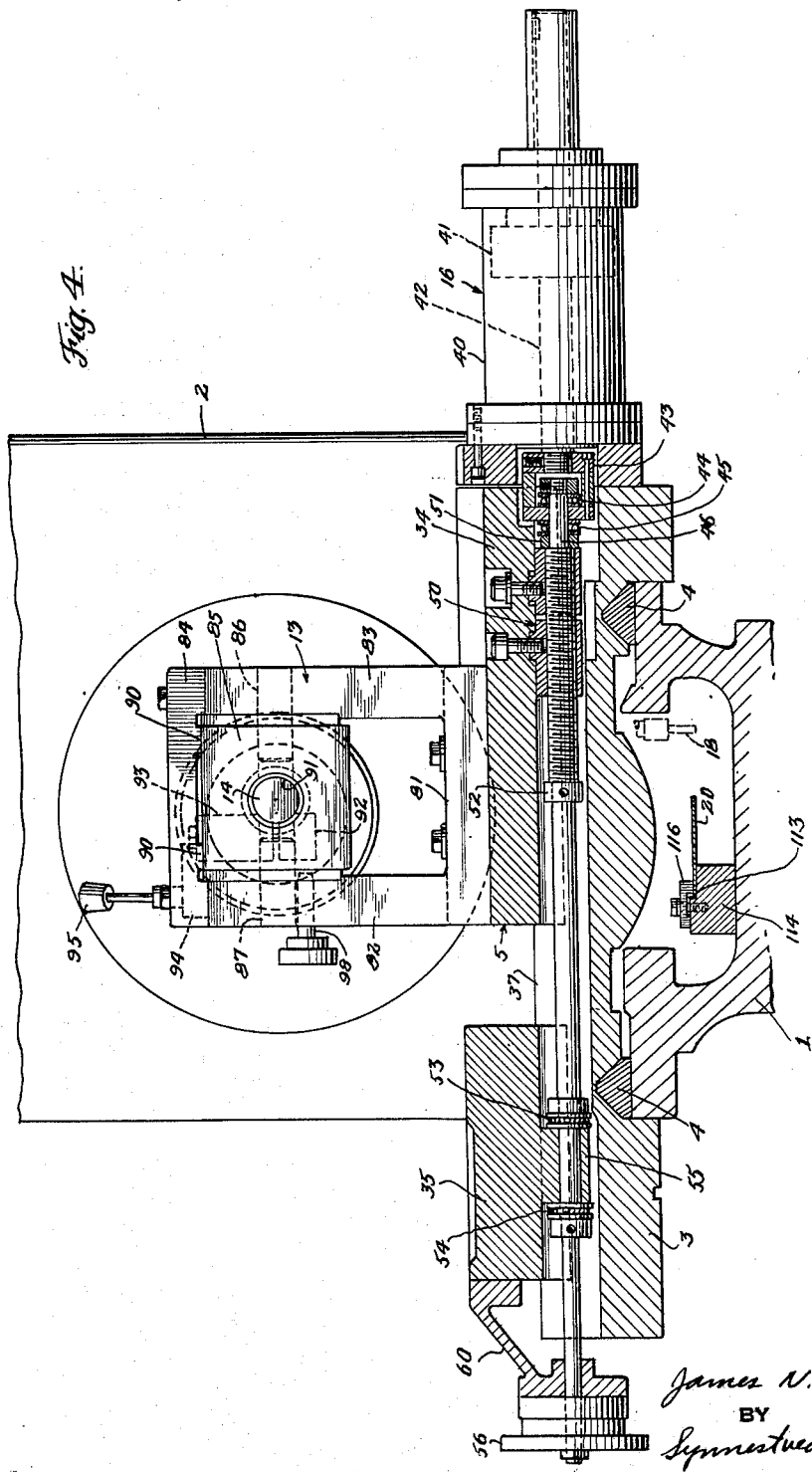

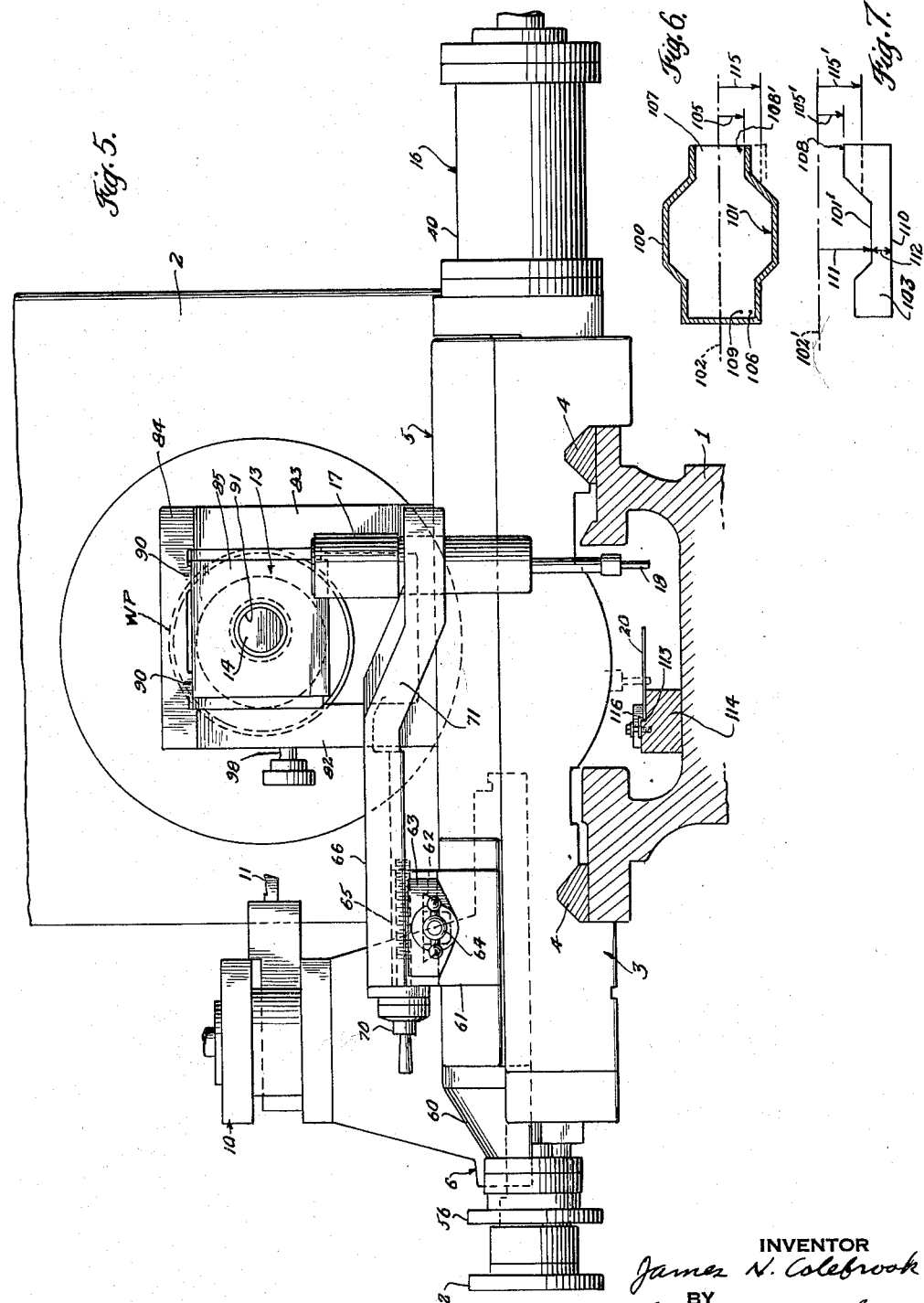

United States Patent Office 3,186,269
Patented June 1, 1965

3,186,269
BORING AND TURNING LATHES
James N. Colebrook, Cincinnati, Ohio, assignor to The Lodge & Shipley Company, Cincinnati, Ohio, a corporation of Ohio
Filed July 3, 1961, Ser. No. 123,360
9 Claims. (Cl. 82—14)

This invention relates to cutting type machine tools and in particular relates to improvements in lathes constructed primarily for use in machining parts as by turning and by contour boring.

In one aspect, the invention contemplates a lathe of the kind mentioned, having a carriage which mounts independently operable turning and boring cross slides, respectively mounting turning and boring tool holders with each slide and its holder being constructed and positionable so that one slide with its holder and tool can function without interference from the other.

In another aspect, the invention contemplates a lathe of the kind mentioned having a carriage which mounts physically separated and independently operable turning and boring cross slides respectively mounting turning and boring tool holders, with the boring tool holder having means to swing a boring bar and tool to an operative position for machining a workpiece and to swing the bar and tool to inoperative position wherein the turning slide and its holder can be operated without interference from the boring bar and tool.

In another aspect, the invention contemplates a lathe of the kind mentioned having a carriage which mounts independently operable turning and boring cross slides respectively mounting turning and boring tool holders with the turning cross slide and its holder being disposed between the boring cross slide and the lathe headstock, the boring tool holder having means mounting a boring bar and tool which in the operative position extends into the path of motion of the turning cross slide and holder, but which is swingable to an inoperative position, wherein the bar and holder are free of the turning slide and holder so that the same are operable without interference.

In another aspect, the invention contemplates a carriage which mounts independently operable turning and boring cross slides respectively mounting turning and boring tool holders, the turning cross slide and holder being disposed between the lathe headstock and the boring cross slide and the boring tool holder having means to mount a boring bar and tool so that the bar and tool can be quickly placed in an operative position or an inoperative position without moving the bar from the holder, the inoperative position permitting movement of the turning slide and holder without interference from the bar.

In another aspect, the invention contemplates for a lathe of the kind in question, a boring tool holder having a base adapted to be mounted on a slide and having a pair of spaced upright members between which is pivotedly mounted a support for holding a boring bar and tool, the support being swingable to a fixed horizontal position wherein the tool is conditional for cutting and also swingable to a fixed vertical position constituting a storage or non-use position.

In a still further aspect, the invention contemplates a lathe of the kind in question having a tracer controlled boring cross slide, improvements providing for the boring tool and tracer stylus to be independently positionable relative to each other, such positioning providing a simple and effective way (which is especially useful in narrow mouth boring jobs) to permit the boring tool after it has finished the workpiece (and still inside the same) to be relieved and then brought out under rapid traverse without any danger of the tool or bar striking the neck of the part.

In another aspect, the invention contemplates in a lathe of the kind in question having a tracer controlled boring cross slide, improvements in tracer means for controlling the operation of a boring tool to provide for the quick adjustment of relieved position of both tool and stylus when replacing a template having a small minimum radius with a template having a larger minimum rdius.

In another aspect, the invention contemplates a lathe of the kind in question having an improved structure for the boring cross slide and its tracer controlled drive, the improved structure providing for the boring tool to be adjusted (along the slide motion axis) relative to the tracer stylus and to the tracer drive means, and also, provides for the stylus to be adustable along the slide axis (independently of the first adjustment) relative to the boring tool and the tracer drive means.

In another aspect, the invention contemplates a lathe of the kind mentioned having a carriage which mounts a boring cross slide including a tracer slide and a boring tool slide which is positionable relative to the tracer slide, the slides being movable in unison under tracer control and the tracer stylus being mounted on the tracer slide for adjustment relative to the slide.

A preferred embodiment of the invention will be described in connection with the following drawings, wherein:

FIGURE 1 is a plan view of a turning and contour boring lathe constructed in accordance with the invention;

FIGURE 2 is an elevational view of the lathe of FIGURE 1;

FIGURE 3 is an elevational view of certain of the components of the lathe of FIGURES 1 and 2, particularly the carriage and the turning and boring cross slides;

FIGURE 4 is a sectional view taken along the lines 4—4 in FIGURE 3;

FIGURE 5 is an end view taken along the lines 5—5 in FIGURE 3;

FIGURES 6 and 7 are respectively diagrammatic sketches of a workpiece to be machined and the control template for the same.

In FIGURE 1 the lathe includes a bed 1, a headstock 2, rotatably mounting a hollow workpiece WP which is to be turned and bored, and a carriage 3 mounted on ways 4 on the bed for reciprocating motion back and forth along the rotational axis of the workpiece. A boring cross slide, generally indicated by the numeral 5 and a turning cross slide 6 are both mounted on the carriage for reciprocating motion in a direction at 90° to the direction of the carriage movement.

The turning slide 6 mounts a holder 10 adapted to support a turning tool 11, the 90° motion of the turning slide controlled by a conventional nut and screw arrangement manually operated by the wheel 12. The 90° motion of the turning slide provides for the tool 11 be movable across center; i.e., across the rotational axis of the workpiece. In FIGURE 1 the turning cross slide is positioned at its limit toward the front of the lathe.

The boring cross slide 5 mounts a holder 13 adapted to support a boring bar 14 carrying the boring tool 15. In FIGURES 1 and 2 the boring bar is in position for the tool to machine or cut material from the inside of the workpiece. This is the operative position of the boring bar. By means which will be explained later, the boring bar may be swung or pivoted into a vertical position as indicated by the dotted lines 14a in FIGURE 2.

The motion of the boring cross slide 5 along the 90° axis is tracer controlled, the fluid motor for the tracer being indicated at 16, the tracer valve at 17, the stylus at 18 which cooperates with a template 20 mounted on the bed. In FIGURE 1 the boring cross slide is in relieved position or all the way to the rear of the lathe. When the cross slide is put in trace it moves toward the front of the machine or until the stylus 18 engages the template 20.

Without further detailed description, it will be seen that the above structure provides a carriage mounting turning and boring cross slides which are independently operable and respectively carry turning and boring tools. It is contemplated that the boring and turning operations be accomplished independently and not simultaneously as otherwise the turning tool might impose a variable load on the boring tool and cause the same to fail to follow the dictates of the tracer.

With reference to FIGURES 1 and 2, it will be observed that the turning cross slide and its holder are disposed between the headstock and the boring cross slide. The turning cross slide and its holder are constructed so that when the machine is set up for a boring operation (as indicated in FIGURE 1) they are positioned toward the front of the machine, spaced from the boring bar and its holder and beyond the swing of the workpiece. In this position the boring cross slide, holder and bar can be operated without interference from the turning elements.

During a turning operation, the boring tool, holder and cross slide are conditioned whereby the turning operation can be performed without interference from the boring elements. Thus it will be apparent that with the boring bar in the position indicated at 14a it is spaced away from the path of the turning tool holder. Further, it will be noted that neither the boring cross slide nor the boring tool holder project into the path of motion of the turning cross slide nor the turning tool holder.

Thus it is pointed out that the above described structure, comprising boring and turning cross slides and holders commonly mounted on a single carriage and structurally arranged for independent operation without interference from one another and particularly the swing up feature of the boring bar, constitute an important part of the invention. The advantages of this kind of construction will be readily apparent to those skilled in the art. From the standpoint of high production the non-interference feature is of particular significance because operation may be changed from turning to boring or vice versa with a very minimum of effort on the part of the lathe operator. Additionally the above described structure represents an advance over conventional lathes (arranged primarily for turning and boring) from the standpoint of lower costs, for example, dual carriages and multiplicity of controls for the same have been eliminated and it is unnecessary to use two independent lathes one for turning and one for boring.

With the above in mind then certain of the structural details of the above mentioned components will be described below.

First of all the carriage 3 in itself is a generally flat H-shaped casting, the H effect being provided by the cut-outs 22 and 23 (FIGURE 1). With reference to FIGURE 4, it will be observed that the carriage is slidably mounted on the bed 1 by virtue of the ways 4. With reference to FIGURE 1, it will be noted that the center part of the H-shaped carriage structure mounts the turning and boring cross slides. The front part of the carriage is connected with an apron 24 (FIGURE 2). The carriage is adapted to be reciprocated on the ways by conventional drive mechanism, for example, the drive mechanism usually associated with an engine lathe and for that reason the carriage drive or feed is not illustrated or described.

The turning tool slide is a generally flat rectangular shaped member which is mounted on the carriage for 90° motion by means of the ways 25 and 26, (FIGURE 3), which are fixedly secured to the carriage and guide the slides in the desired direction and over the appropriate distance. A conventional nut and screw mechanism is adapted to move the carriage on the 90° path, the screw being indicated at 30 in FIGURE 3. The screw is rotated by the wheel 12. The turning tool holder 10 is mounted on slide 6 and extends generally upright therefrom. The holder 10 is somewhat rectangular in cross section and it is configured to contribute to the non-interference condition commented on heretofore. The means 31 on the holder 10 for gripping tool 11 is conventional and need not further be described.

The boring cross slide and its tracer drive have improvements which form an important part of the lathe. According to the invention the boring cross slide and its tracer drive are arranged to provide for moving the boring tool and tracer stylus in unison and also providing for relative independent positioning of the boring tool and stylus along the 90° axis.

For the above purpose, the boring cross slide comprises two component slides, one a tracer slide which mounts the tracer valve and the other a boring tool slide which mounts the holder and boring bar. These slides are interconnected to be movable in unison under the control of the tracer valve, but so that the boring tool slide can be adjusted along the 90° axis relative to the tracer slide without disturbing the stylus position. The tracer stylus is mounted on the tracer slide by means operative so that the tracer valve can be adjusted along the 90° axis relative to the tracer slide and hence to the boring tool slide or boring tool. Thus, as between the tracer stylus and the boring tool there are two independent adjustments along the 90° axis. As will be pointed out more in detail hereinafter, the adjustment feature is most advantageous in a boring operation in that it permits the boring tool to be relieved and brought out of the part at rapid traverse without any possible danger to the boring bar striking on the machined part. It will be understood of course, that this feature is of special significance from the standpoint of production because it permits the operator to rapidly set up the machine for another operation after one has finished. Additionally, the adjusting feature is significantly advantageous when different parts (requiring different templates) are to be bored, and particularly, in cases where the new part has a larger minimum radius than the old part. In such instances, the adjusting feature permits the operator to quickly set up the stylus and tool in the correct position for tracing.

The boring tool slide 34 and the tracer slide 35 (see FIGURES 1 and 4) are substantially flat rectangular castings and both mounted on common ways 37 secured to the carriage 3. The boring tool slide and the tracer slide are arranged to be moved in unison under the control of the tracer and for adjustment of the boring tool slide relative to the tracer slide by the mechanism which will be described following.

With reference to FIGURE 4, the tracer drive motor 16 comprises a hydraulic cylinder 40 which is fixed to the carriage 3. A piston 41 is disposed within the cylinder for reciprocating motion, the motion of the piston being along the 90° axis. Fluid for operating the piston is controlled by the tracer valve 17 in a well known manner and it is believed unnecessary for the benefit of those skilled in the art to describe or illustrate a typical hydraulic tracer system. On the end of the piston 41 or more specifically, on the piston rod 42 there is mounted a hollow coupling member 43 which is connected by the thrust bearings 44 and 45 to a screw 46. The coupling 43 and bearings 44 and 45 cause the screw 46 to be displaced along its axis with movement of the piston, but provide for the screw to be rotatable relative to the coupling and piston.

The screw 46 is threaded as indicated and associated with the threads is a nut 50 which is a conventional two-part anti-backlash structure. The nut 50 is fixed to the boring tool slide 34. Rotation of the nut causes translation of the boring tool slide along the ways 37. The motion of the slide to the right (as viewed in FIG- URE 4) is limited by the engagement of the nut with the stop-collar 51 and motion of the slide to the left is limited by the stop-collar 52 pinned to the screw. Preferably the stroke of the slide is the same as the stroke of the piston.

To the left of the stop-collar 52 the screw is not threaded and a set of thrust bearings 53 and 54 rotatably couple the screw to a collar 55 which is fixed to the tracer slide 35. This construction provides that the screw can be rotated relative to the tracer slide 35, but that with displacement of the screw along its axis the tracer slide 35 will partake of the corresponding motion along its ways 37. The screw is adapted to be rotated by a wheel 56 which is supported by a bracket 60 connected with the tracer slide.

In summary: Rotation of wheel 56 adjusts the boring tool slide 34 relative to the tracer slide 36 and also relative to the tracer drive or piston 41; when the screw 46 is moved by the piston 41, boring tool slide 34 and tracer slide 35 move in unison with the piston.

In the position of the parts as shown in FIGURE 4 (and also in FIGURES 1 and 2), the boring cross slide is relieved; i.e., it is as far to the rear of the machine as the travel of the piston 41 will permit. Also it will be noted that the screw 46 has been rotated so that the boring slide 34 is at its maximum adjustment toward the rear of the machine.

The mounting of the tracer valve on the tracer slide 35 will next be described.

With reference to FIGURES 4 and 5, it will be seen that the tracer slide has an extension or bracket 61. The bracket 61 has a set of dovetails 62 on which are disposed a bottom slide 63. A wheel 64 is connected to a conventional nut and screw arrangement so that rotation of the wheel will cause movement of the bottom slide 63. The dovetails 62 are set up so that the motion of the bottom slide 63 is parallel to the rotational axis of the workpiece.

With reference to FIGURE 3, the bottom slide 63 carries a set of dovetails 65 on which are disposed a top slide 66. A wheel 70 is connected to a conventional nut and screw arrangement so that rotation of the wheel causes the top slide 66 to move back and forth on the bottom slide. The dovetails 65 are set up so that this motion is along the 90° axis and the total stroke is preferably the same as the stroke of piston 41. The top slide 66 carries a supporting arm 71, which partakes of the motion of the top slide. The arm 71 mounts the tracer valve 17.

From the foregoing description, it will be apparent that with rotation of the wheel 70, the tracer stylus is adjusted along the 90° axis with respect to the boring tool slide and hence with respect to the boring tool 15 supported by the slide, (and also adjusted relative to the tracer drive piston 41). The position of the boring tool is not disturbed by this adjustment of the stylus. Also from the description of he adjustment of the boring tool slide (wheel 56) the boring tool can be adjusted along the 90° axis without disturbing the stylus adjustment.

The utilization of the adjustment of the tracer stylus, and the adjustment of the boring tool along the 90° axis will be commented on more in detail hereinafter. First, however, it is desired to describe the structure of the boring tool holder 13.

With reference to FIGURES 3, 4, and 5 the boring tool holder 13 is generally U-shaped having a base or bridge member 81, which is constructed to be secured to the boring tool slide 34 together with two vertically extending legs 82 and 83. Across the mouth of the U, and connected to the legs 82 and 83 is a stop member 84. Disposed between the legs 82 and 83 is a support member 85 which is pivotally connected with the legs by the pivots 86 and 87. The support member carries the boring bar 14. As best shown in FIGURE 4, the stop member 84 has a pair of abutments 90 which are engaged with the support member 85. The engagement between the abutments 90 and the support determines the location of the support to orient the boring bar and boring tool as shown in FIGURES 1 and 3; i.e., the operative or machining position. The support member 85 has an aperture 91 which accepts the end of the boring bar 14 and the bar is clamped in position by means of the nuts 92 and 93. The boring bar and support may be locked in the operative position by means of the dog 94 which can be swung over the support by the rotation of the handle 95.

The inoperative position of the support and boring bar is indicated by the dot-dash lines 14a and 85a in FIGURE 3. It will be apparent that to move the boring bar to the inoperative position it is simply necessary to relieve the dog 94 and swing the bar upwardly about the pivots 86 and 87. The boring bar and support can be locked in the up position by means of the spring loaded plunger 98 which is adapted to fit into an aperture 99 in the block when the same is in the inoperative position.

The boring bar holder as above described plays an important part in the overall operation of the lathe particularly from the standpoint of providing a sound, firm structure which will adequately support and position the boring bar and its connecting tool for a machining operation and especially in that the structure readily permits the bar and tool to be quickly moved from the operative to the inoperative position and then back to the operative position without disturbing the desired location of the tool for a boring operation. Furthermore, the structure described functions and cooperates with the turning and boring cross slides and particularly with their configuration and structure and disposition for interference free turning and bar machine work.

Returning now to the mounting arrangement described above for adjustably positioning the boring tool and tracer stylus in the 90° direction, the following examples will suffice to illustrate the advantages.

With reference to FIGURE 6, assume that a workpiece 100 has an internal contoured surface 101 to be machined. The center line or rotational axis of the part is indicated at 102. In FIGURE 7 template 103 for controlling the contour boring operation has a stylus engaging surface 101′ of the same shape as surface 101 and the template center line which corresponds to the part centerline is indicated at 102′. It will be observed that the finished bore will have a minimum radius 105 which is much less than any other radius on the contour. (On the template radius is indicated at 105′.) After a boring tool has machined the surface 101 of the workpiece (and is located, say, at the point 106), it is highly desirable that the tool be brought out of the work at the fastest rate possible. If the boring slide is relieved there may be a likelihood of the boring bar or tool striking the mouth 107 of the piece. The adjusting feature described heretofore provides for alleviating any possibility of this condition.

Assuming that the boring cross slide is bottomed as shown in FIGURE 4, the wheel 70 is adjusted until the stylus 18 is slightly spaced from the minimum radius for example, located at the point 108. The wheel 56 then can be manipulated to space the boring tool the same distance from the minimum radius 105 on the workpiece as the stylus is from the minimum radius 105′ or at point 108′. In such a position, of course, it is necessary that the boring bar fully clear the mouth of the work. Since the foregoing represents the relieved position of the boring cross slide it will be apparent that after the surface 101 has been machined or when the tool has reached the point indicated by 106 relieving the cross slide will simply cause the tool to move radially to a position 109 which corresponds to point 108′. Thus the boring bar will free from the mouth. At this time the carriage can be moved to the rear at rapid traverse and the tool brought out of the piece without any danger of either the bar or the tool colliding with a workpiece.

Actually, of course, when the stylus and tool are initially adjusted to the points 108 and 108', the handle 56 may be manipulated to bring in the tool closer to the piece for skimming or rough cuts and for final adjustment for the finish cut.

For maximum advantage to be taken of the adjusting feature it is contemplated that any template used in the machine be of a type such that the maximum radius of the contour is always located at a fixed distance from a datum surface on the template. For example, in FIGURE 7 the template 103 has a datum surface 110 and a maximum radius as indicated at 111. This maximum radius is always located at a fixed distance 112 from the datums surface 110. Any other template which is to be substituted in the machine should be set up in the similar manner, that is that the maximum radius be located a fixed distance from the datum surface. Referring to FIGURE 4, the lathe is also provided with a fixed datum surface 113 to locate the template datum surface 110. The datum surface 113 is formed on block 114 fixed to the bed. The template is held on the block by the dogs 116. The datum surface 113 is at a fixed and known position from the vertical plane containing the rotational axis of the work.

A type of template mentioned above and the 90° stylus adjustment (by wheel 70) and the 90° boring tool adjustment (by wheel 56) cooperate to provide for quick adjustment of relieved position of tool and stylus when changing the templates.

With reference to FIGURE 6 assume a new part having a larger minimum radius, for example, as indicated at 115 were to be bored. This would require a new template having a minimum radius as indicated at 115'. With the stylus and the tool in the relieved position of the previous job (near points 108' and 108) starting tracer operation would require movement from the relieved position to the new minimum radius position. This movement would be relatively slow and considerable time would be lost in repeat operations on the same part. By simply adjusting the wheels 56 and 70, the tool and stylus can be brought into the desired position with respect to the new minimum radius.

In connection with the internal configuration of the workpiece of FIGURE 6, it will be appreciated that the particular contour shown is for descriptive purposes.

I claim:
1. For a machine tool having a bed and a headstock to rotatably support a workpiece, mechanism for mounting and moving a boring tool for use in machining the workpiece comprising:
   a carriage mounted for reciprocating motion on said bed in a direction along the rotational axis of the workpiece;
   a boring tool slide mounted on said carriage for reciprocating motion in a direction normal to the direction of said carriage motion;
   a boring tool holder on said boring tool slide;
   support means for mounting a boring tool and having pivot connections with said boring tool holder, the pivot connections providing for the support means to be rotated to an operative position where a boring tool on the support is oriented for machining a workpiece and to an inoperative position wherein the tool on the support is substantially spaced from its operative position;
   a cylinder connected with said carriage and a piston mounted on the cylinder for reciprocating motion in a direction the same as the direction of motion of said boring tool slide;
   a screw;
   means connected between said piston and said screw and providing for the screw to be rotatable relative to the piston and for the screw to be displaceable with the piston;
   means connecting said tracer slide and said screw and providing for the tracer slide to be displaceable with the screw and for the tracer to be immovable when the screw is rotated;
   a tracer slide mounted on said carriage for reciprocating motion in the same direction as the motion of said boring tool slide;
   means connecting said screw and said tracer slide and providing for the tracer slide and screw to be fixed against relative movement in a direction the same as the direction of motion of the boring tool slide and also providing for the screw to be rotatable relative to the tracer slide;
   means for supporting a tracer valve and stylus the valve being for use in controlling fluid to said cylinder; and
   connections between said tracer valve supporting means and said tracer slide providing for the supporting means to be positioned with respect to the tracer slide in a direction the same as the direction of movement of said boring tool slide.

2. A construction in accordance with claim 1 further including:
   a tracer valve and stylus on said supporting means;
   means on said bed forming a datum surface parallel to and at a predetermined distance from said rotational axis;
   means on said bed for mounting any of a plurality of templates, each template having a datum surface to engage first said datum surface and each template having a contour to be engaged by said stylus, the maximum radius of each of the contours of the templates being a fixed distance from its datum surface.

3. A construction in accordance with claim 1 wherein said boring tool holder comprises a U-shaped member, the bridge of the U being mounted on said boring tool slide with the legs of the U extending generally vertically and wherein the support means and the pivot connections provide for a boring bar in the support to extend horizontally when the support is in the operative position and for the bar to extend generally vertically when the support is in the inoperative position.

4. For a machine tool having a bed and a headstock to rotatably support a workpiece, mechanism for mounting and moving a boring tool for use in machining the workpiece comprising:
   a carriage mounted on said bed for reciprocating motion in a direction along the rotational axis of the workpiece;
   a boring tool slide mounted on said carriage for reciprocating motion in a direction transverse the direction of carriage motion;
   a tracer slide separated from said boring tool slide and directly slidably mounted on said carriage for reciprocating motion in a direction the same as said direction of the boring tool slide;
   a turning tool slide and holder mounted on said carriage for reciprocating motion in a direction normal to the direction of carriage motion, the slide and holder being disposed on the carriage between said headstock and said boring tool and tracer slides;
   a boring tool holder on said boring tool slide and having support means for mounting a boring tool, the support being rotatable to an operative position wherein a boring tool mounted on the support extends into the path of motion of said turning tool holder and also being rotatable to an inoperative position wherein a boring tool mounted on the support is free from said path;
   drive means including a tracer motor on said carriage;
   mechanism connecting the boring tool slide with said drive means and connecting the tracer slide with said drive means for moving the slides in unison in said direction;
   means connected with said boring tool slide and said mechanism and providing for moving the boring tool slide in said direction with respect to said tracer slide and said drive means;

means for supporting a tracer valve and stylus;

connections between said tracer valve supporting means and said tracer slide providing the supporting means to be positioned with respect to the tracer slide in a direction the same as the direction of movement of said boring tool slide;

a tracer valve and stylus on said support means;

means on said bed forming a datum surface parallel to and at a predetermined distance from said rotational axis; and means on said bed for mounting any of a plurality of templates, each template having a datum surface to engage first said datum surface and each template having a contour to be engaged by said stylus, the maximum radius of each of the contours of the templates being a fixed distance from its datum surface.

5. For a machine tool having a bed and a headstock to rotatably support a workpiece, mechanism for mounting and moving a boring tool for use in machining the workpiece comprising:

a carriage mounted on said bed for reciprocating motion in a direction along the rotational axis of the workpiece;

a boring tool slide and a tracer slide each mounted on common ways on said carriage for reciprocating motion along a path transverse the direction of said carriage motion, two slides being physically separated from one another along said path;

piston and cylinder means on said carriage, the piston having a drive element extending in the same direction as said path;

connections between each slide in said drive element to provide for movement of the slides in unison and for adjusting the boring tool slide along said path to vary the separation of the slides;

means for supporting a tracer valve, the valve being for use in controlling fluid for said piston and cylinder means;

connections between said tracer valve supporting means and said tracer slide providing for movement of the supporting means relative to the tracer slide in a direction the same as the direction of movement of said boring tool slide;

a boring tool holder mounted on said boring tool slide and having means for supporting a boring tool in an operative position wherein the tool is oriented to enter a cavity in a workpiece and in an inoperative position wherein the tool is conditioned to be incapable of entering a cavity on a workpiece; and a template mounted on said bed and a tracer valve including a stylus mounted on said tracer valve supporting means, the stylus engaging the template for controlling the valve.

6. For a machine tool having a bed and headstock to rotatably support a workpiece, mechanism for mounting and moving a boring tool for use in machining the workpiece comprising:

a carriage mounted on said bed for reciprocating motion in a direction along the rotational axis of the workpiece;

a boring tool slide and a tracer slide each mounted on said carriage for reciprocating motion along a path transverse to the direction of said carriage motion, the two slides being physically separated from one another along said path;

piston and cylinder means on said carriage, the piston having a drive element extending in the same direction as said path;

connections between each slide and said drive element to provide for movement of the slides in unison and for adjusting the boring tool slide along said path to vary the separation of the slides;

means for supporting a tracer valve and stylus, the valve being for use in controlling fluid for said piston and cylinder means;

connections between said tracer valve supporting means and said tracer slide and providing for adjustable movement of the stylus relative to the tracer slide in a direction the same as the direction of movement of said boring tool slide; and means on said bed forming a datum surface parallel to and at a predetermined distance from said rotational axis; and means on said bed for mounting any of a plurality of templates, each template having a datum surface to engage first said datum surface and each template having a contour to be engaged by said stylus, the maximum radius of each of the contours of the templates being at a fixed distance from its datum surface.

7. For a machine tool having a bed and a headstock to rotatably support a workpiece, mechanism for mounting and moving a boring tool for use in machining the workpiece comprising:

a carriage mounted on said bed for reciprocating motion in a direction along the rotational axis of the workpiece;

a boring tool slide and a tracer slide each mounted on common ways on said carriage for reciprocating motion along a path transverse the direction of said carriage motion, the two slides being physically separated from one another along said path;

a turning tool slide and holder mounted on said carriage for reciprocating motion in a direction normal to the direction of carriage motion, the slide and holder being disposed on the carriage between the headstock and said boring and tracing slides;

a boring tool holder on said boring tool slide and having support means for mounting a boring tool, the support being rotatable to an operative position wherein a boring tool mounted on the support extends into the path of motion of said turning tool holder and also rotatable to an inoperative position wherein a boring tool mounted on the support is free from said path;

piston and cylinder means on said carriage, the piston having a drive element extending in the same direction as said path;

connections between said tracer slide and said boring tool slide and said element to provide for movement of the slides in unison and for adjusting the boring tool slide along said path to vary the separation of the slides;

means for supporting a tracer valve, the valve being for use in controlling fluid for said piston cylinder means; and connections between said tracer valve supporting means and said tracer slide and providing for adjustable movement of the supporting means relative to the tracer slide in a direction the same as the direction of movement of said boring tool slide.

8. For a machine tool having a bed and headstock to rotatably support a workpiece, mechanism for mounting and moving a boring tool for use in machining the workpiece comprising:

a carriage mounted on said bed for reciprocating motion in a direction along the rotational axis of the workpiece;

a boring tool slide and a tracer slide each mounted on said carriage for reciprocating motion along a path transverse the direction of said carriage motion, the two slides being physically separated from one another along said path;

drive means on the carriage including an elongated drive element extending in the same direction as said path;

connections between said slides and said drive element to provide for movement of the slides in unison, and for adjusting the boring tool slide along said path to vary the separation of the slides;

means for supporting a tracer valve, the valve being for use in controlling said drive means;

connections between said tracer valve supporting means and said tracer slide and providing for adjustable movement of the supporting means relative to the tracer slide in a direction the same as the direction of movement of said boring tool slide; and a template mounted on said bed and a tracer valve including a stylus mounted on said tracer valve supporting means, the stylus engaging the template for controlling the valve.

9. For a machine tool having a bed and a headstock to rotatably support a workpiece, mechanism for mounting and moving a boring tool for use in machining the workpiece comprising:

a carriage mounted on said bed for reciprocating motion in a direction along the rotational axis of the workpiece;

a boring tool slide carrying a boring tool and slide means carrying a tracer valve and stylus, each slide being mounted on said carriage for reciprocating motion along a path transverse the direction of carriage motion, the two slides being physically separated from one another along said path;

drive means on said carriage controlled by said tracer valve; and interconnections between said drive means and each of said slides and providing for moving the slides in unison along said path for a machining operation and also providing for moving either one of said slides relative to the other along said path to vary the separation between the slides to vary the relative transverse spacing between the boring tool and tracer stylus.

References Cited by the Examiner

UNITED STATES PATENTS

| | | | |
|---|---|---|---|
| 1,582,077 | 4/26 | Palmer | 77—60 X |
| 1,896,052 | 1/33 | Ferris | 82—14 X |
| 2,051,127 | 8/36 | Bickel et al. | 82—14 |
| 2,250,241 | 7/41 | Thalmann | 82—14 X |
| 2,372,427 | 3/45 | Johnson | 82—14 |
| 2,401,422 | 6/46 | Hamilton | 82—14 |
| 2,634,644 | 4/53 | Johnson | 82—14 |
| 2,645,967 | 7/53 | Von Zelewsky | 82—14 |
| 2,676,500 | 4/54 | Addison | 77—58 |
| 2,711,113 | 6/55 | Audemar | 82—14 |
| 2,727,419 | 12/55 | Evans | 82—14 |
| 3,000,240 | 9/61 | Eckardt | 77—58 |

FOREIGN PATENTS

| | | |
|---|---|---|
| 922,625 | 1/55 | Germany. |
| 418,370 | 2/47 | Italy. |

ANDREW R. JUHASZ, *Primary Examiner.*

LEON PEAR, WILLIAM W. DYER, Jr., *Examiners.*

UNITED STATES PATENT OFFICE
CERTIFICATE OF CORRECTION

Patent No. 3,186,269                                                      June 1, 1965

James N. Colebrook

It is hereby certified that error appears in the above numbered patent requiring correction and that the said Letters Patent should read as corrected below.

Column 1, line 59, for "conditional" read -- conditioned --; column 2, line 7, for "rdius" read -- radius --; column 5, line 57, for "he" read -- the --; column 7, line 75, beginning with "means connecting said" strike out all to and including "screw is rotated;" in line 3, column 8, and insert the same after line 6, in column 8; column 7, line 74, after "piston;" insert the following paragraphs:

a nut on said screw connected with said boring tool slide and providing for displacement of the screw to cause movement of the boring tool slide in unison therewith and for rotation of the screw to cause movement of boring tool slide relative to the screw;
   means for rotating said screw to cause movement of boring tool slide;

column 8, line 7, beginning with "means connecting said" strike out all to and including "the tracer slide;" in line 12, same column 8.

Signed and sealed this 23rd day of November 1965.

(SEAL)
Attest:

ERNEST W. SWIDER                         EDWARD J. BRENNER
Attesting Officer                        Commissioner of Patents